(12) United States Patent
Castaneda

(10) Patent No.: US 12,492,543 B2
(45) Date of Patent: Dec. 9, 2025

(54) OFFSET PIPING DEVICE

(71) Applicant: Carlos Castaneda, Indio, CA (US)

(72) Inventor: Carlos Castaneda, Indio, CA (US)

( * ) Notice: Subject to any disclaimer, the term of this patent is extended or adjusted under 35 U.S.C. 154(b) by 144 days.

(21) Appl. No.: 18/382,491

(22) Filed: Oct. 21, 2023

(65) Prior Publication Data

US 2025/0129589 A1 Apr. 24, 2025

(51) Int. Cl.
  *E03D 11/14* (2006.01)
  *F16L 47/28* (2006.01)

(52) U.S. Cl.
  CPC ............... *E03D 11/14* (2013.01); *F16L 47/28* (2013.01)

(58) Field of Classification Search
  CPC ......... F16L 47/28; E03D 11/143; E03D 11/14
  See application file for complete search history.

(56) References Cited

U.S. PATENT DOCUMENTS

| | | | |
|---|---|---|---|
| 3,855,649 A * | 12/1974 | Morris | E03D 11/14 4/DIG. 15 |
| 4,185,334 A | 1/1980 | Izzi | |
| D355,958 S | 2/1995 | Teskey | |
| 6,052,839 A | 4/2000 | Teskey | |
| D443,680 S | 6/2001 | Cummings | |
| D574,931 S | 8/2008 | Hughes | |
| 8,910,321 B2 * | 12/2014 | Coronado | E03D 11/14 285/58 |
| 9,315,980 B2 * | 4/2016 | Stonecipher | E03D 11/16 |
| D814,612 S | 4/2018 | Vishwakarma | |
| 2004/0163165 A1 | 8/2004 | Ortiz | |

FOREIGN PATENT DOCUMENTS

| | | | | |
|---|---|---|---|---|
| DE | 202009008338 U1 * | 8/2010 | ............. | E03D 11/14 |
| WO | WO2013089822 | 6/2013 | | |

OTHER PUBLICATIONS

Translation DE_202009008338 U1 (Year: 2025).*

* cited by examiner

*Primary Examiner* — Janie M Loeppke

(57) ABSTRACT

An offset piping device for relocating a sewer stub-out for a urinal without damaging a finished wall includes a pipe having a first portion, a second portion, and a middle portion extending therebetween. The middle portion is angled relative to the first and second portions whereby the first portion is offset from the second portion. A flange is rotatably coupled to the second portion. The flange can be used to couple a urinal to a wall when the first portion is being coupled with a drainpipe for the urinal. Because the first portion is offset from the second portion, access for the drainpipe relative to the wall is adjusted.

17 Claims, 6 Drawing Sheets

OFFSET PIPING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pipe connectors and more particularly pertains to a new pipe connector for relocating a sewer stub-out for a urinal without damaging a finished wall.

(2) DESCRIPTION OF RELATED ART INCLUDING INFORMATION DISCLOSED UNDER 37 CFR 1.97 AND 1.98

The prior art relates to pipe connectors. The prior art discloses brackets and fittings for coupling a urinal to a soil pipe, drainpipe, or a stub-out. Some disclosures include brackets having a threaded surface around an opening to threadably couple the bracket to the stub-out. Other disclosures describe devices having two pieces of piping that can be arranged along a horizontal plane with a bracket positioned therebetween to couple the drainpipe with the urinal. The prior art typically discloses brackets or fittings that need to be installed directly on the drainpipe, which can require access to the pipe behind a finished wall. The prior art also lacks disclosure of a piping device that can be used to adjust a position or height of the drainpipe relative to the wall. Such a device would be helpful when the drainpipe has been installed incorrectly, or when the finishing elements of the wall, or the floor, have added thickness to the wall or floor thereby positioning the drainpipe at an improper height for installation of a urinal. Additionally, such a device would be helpful in adjusting the position of a urinal drainpipe for installation of urinals that comply with the Americans with Disabilities Act requirements in buildings or locations that do not otherwise comply with those regulations. Thus, there is a need in the art for a device that can offset the position of a drainpipe relative to the wall surface and that can be coupled to the drainpipe without damaging a finished wall.

(h) BRIEF SUMMARY OF THE INVENTION

An embodiment of the disclosure meets the needs presented above by generally comprising a pipe having a first portion, a second portion, and a middle portion extending therebetween. The middle portion is angled relative to the first and second portions whereby the first portion is offset from the second portion. A flange is rotatably coupled to the second portion. The flange is configured to couple a urinal to a wall when the first portion is being coupled with a drainpipe for the urinal. Because the first portion is offset from the second portion, access for the drainpipe relative to the wall is adjusted.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
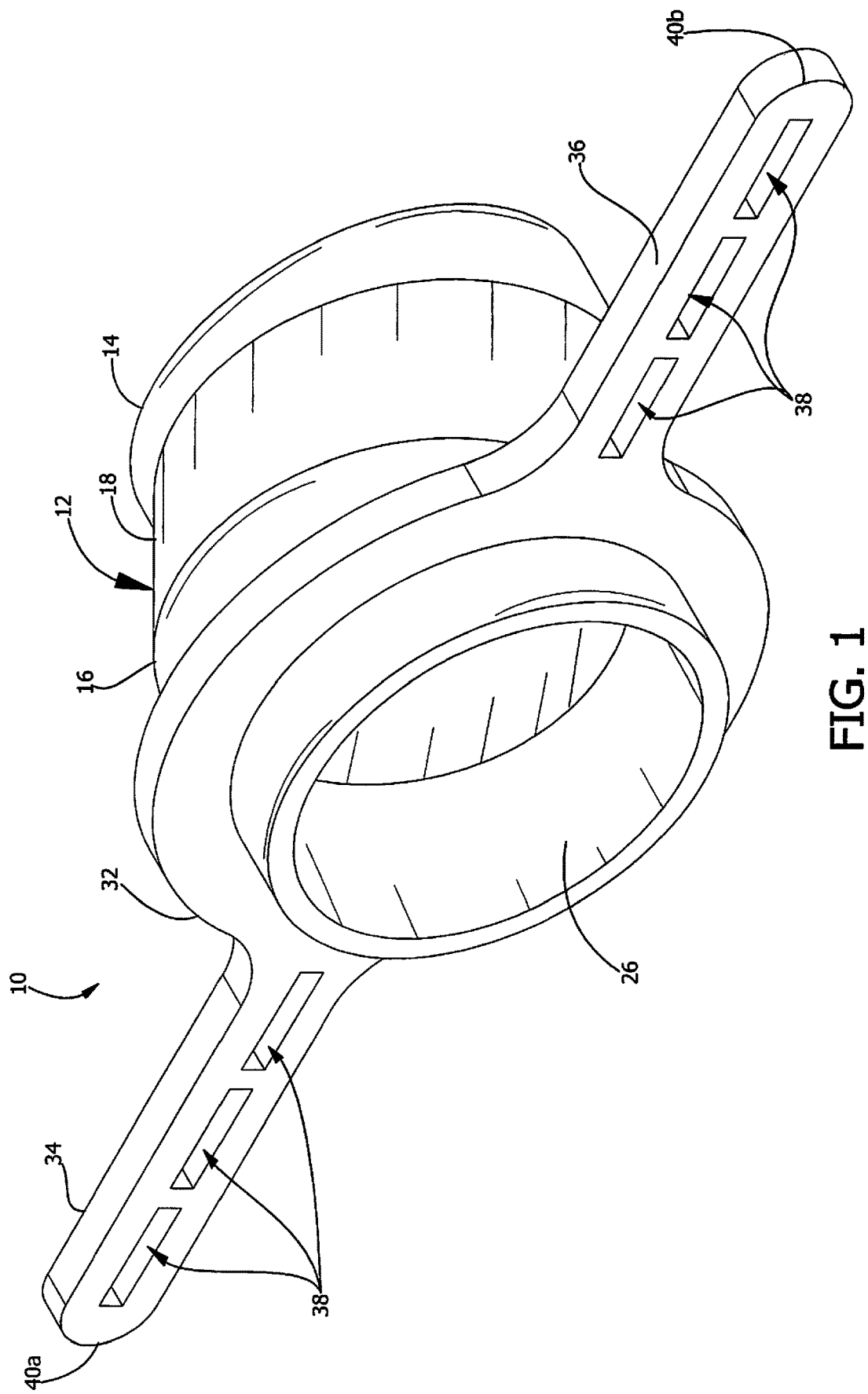
FIG. 1 is an isometric view of an offset piping device according to an embodiment of the disclosure.
Figure 2:
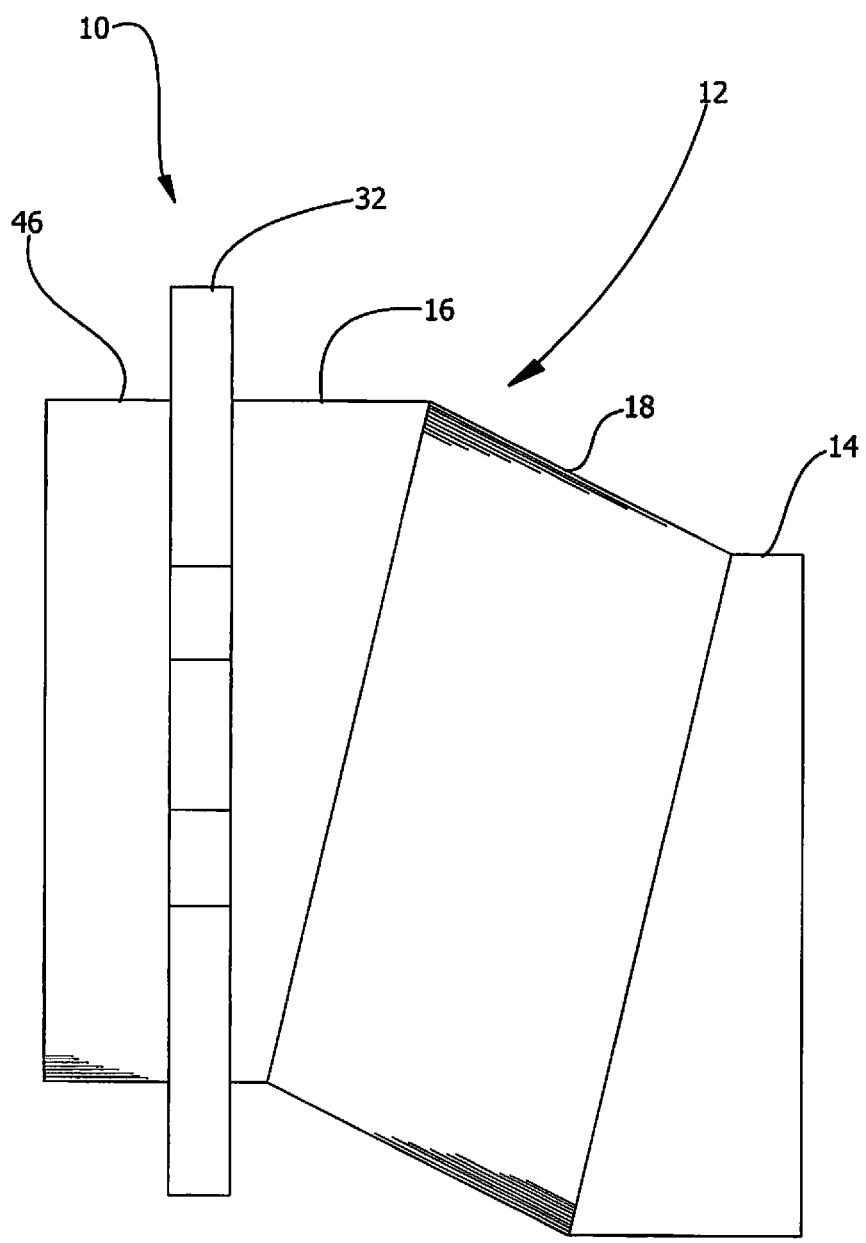
FIG. 2 is a side view of an embodiment of the disclosure.

With reference now to the drawings, and in particular to FIGS. 1 through 6 thereof, a new pipe connector embodying the principles and concepts of an embodiment of the disclosure and generally designated by the reference numeral 10 will be described.

As best illustrated in FIGS. 1 through 6, the offset piping device 10 generally comprises a pipe 12 having a first portion 14, a second portion 16, and a middle portion 18 extending therebetween. The middle portion 18 is angled relative to the first 14 and second 16 portions whereby the first portion 14 is offset from the second portion 16. In embodiments, the first portion 14 may be vertically offset from the second portion 16. For example, a first center point 20 of a first opening 22 extending into the first portion 14 may be between 0.5 inches and 1.5 inches vertically offset from a second center point 24 of a second opening 26 extending into the second portion 16. In other words, the first center point 20 is lower than the second center point 24 relative to the middle portion 18.

The pipe 12 may comprise a polyvinyl chloride ("PVC") material or an acrylonitrile butadiene styrene ("ABS") material. Other plastic piping materials may also be used, but plastics, particularly PVC and ABS, are often preferred materials for plumbing and drainage applications. Because embodiments of the offset piping device 10 may be used for coupling a urinal 50 with a drainpipe 54, the pipe 12 may be made of such materials.

Figure 5:
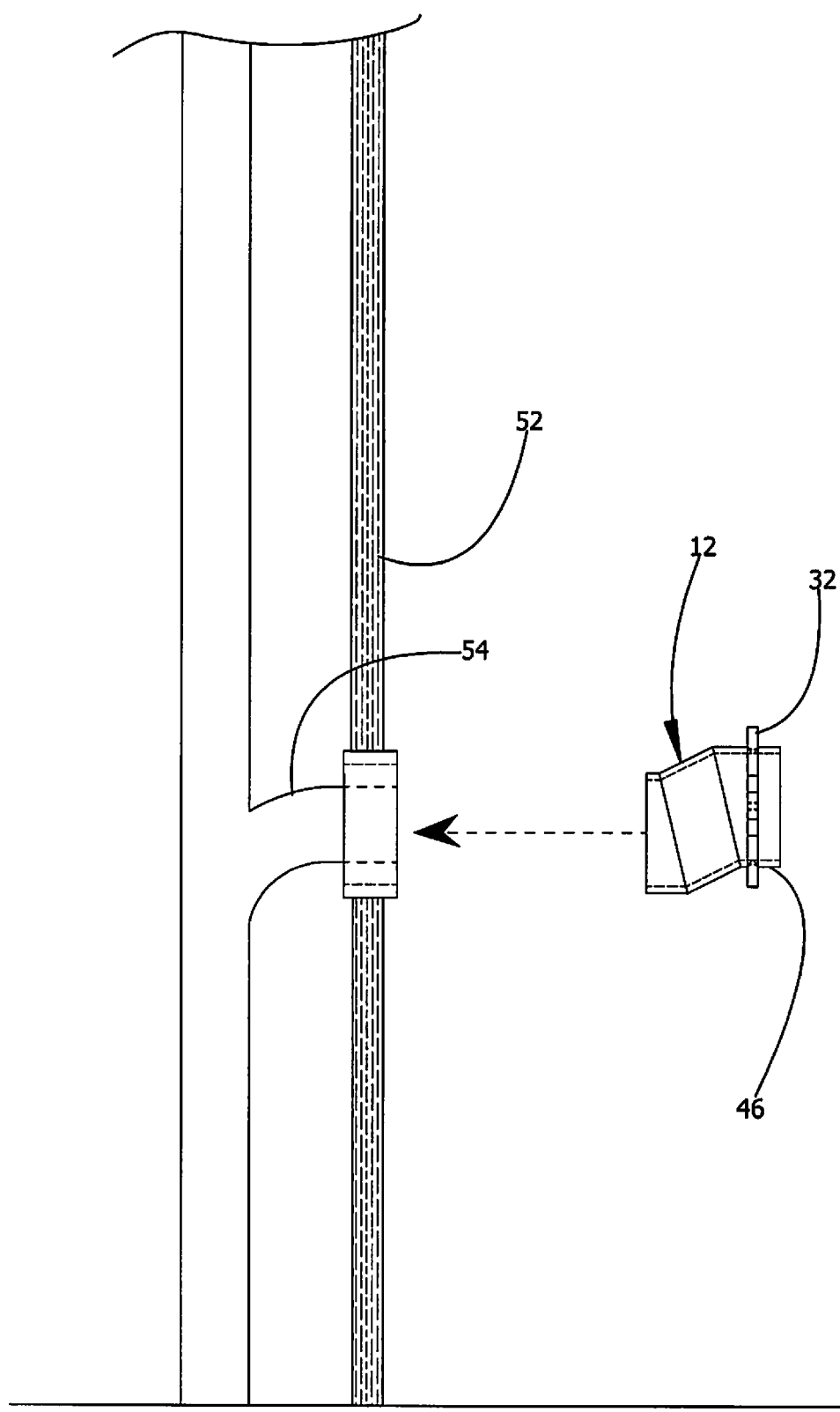
FIG. 5 is an in-use view of an embodiment of the disclosure.

The pipe 12 may be manufactured with any suitable dimensions for coupling a urinal 50 with a drainpipe 54. For example, some embodiments of the pipe 12 may have an inner diameter 28 of between 1.75 inches and 2.25 inches and an outer diameter 30 of between 2.0 inches and 2.75 inches. The pipe 12 may be between 1.5 inches and 2.5 inches long. As shown in FIG. 5, the pipe 12 may extend outwardly from a wall 52 on which the urinal 50 will be installed. The drainpipe 54 may generally have an access, or stub-out, positioned in the wall 52. The pipe 12 can be inserted into the stub-out to raise or lower the position of the stub-out on the wall 52 relative to the floor. This may be useful when the floor has been remodeled, for example by adding tile that changes the thickness of the floor after the stub-out was initially installed. Because the thickness of the floor has changed, the position of the stub-out may no longer be appropriate for urinal installation. Thus, the offset piping device 10 can be used to adjust the position of the stub-out for optimal placement of the urinal 50 without needing to demolish the wall 52 to move the stub-out itself.

A flange 32 is rotatably coupled to the second portion 16. The flange 32 is configured to couple the urinal 50 to the wall 52 when the first portion 14 is being coupled with the drainpipe 54 for the urinal. Access for the drainpipe 54 relative to the wall 52 is adjusted by the first portion 14 being offset from the second portion 16.

The flange 32 may include a first arm 34 and a second arm 36. The first 34 and second 36 arms extend outwardly from the flange 32. The flange 32 rotates around the second portion 16 thereby adjusting an orientation of the first 34 and second 36 arms relative to the wall. For example, the flange 32 may rotate in either a counterclockwise or a clockwise direction around the second portion 16. The first arm 34 and the second arm 36 generally have opposing lateral ends 40a, 40b that are spaced apart from one another. For example, the opposing lateral ends 40a, 40b may be spaced apart by between 7.0 inches and 9.0 inches in some embodiments. The flange 32 may comprise a metal material, although other materials may also be used.

Figure 3:
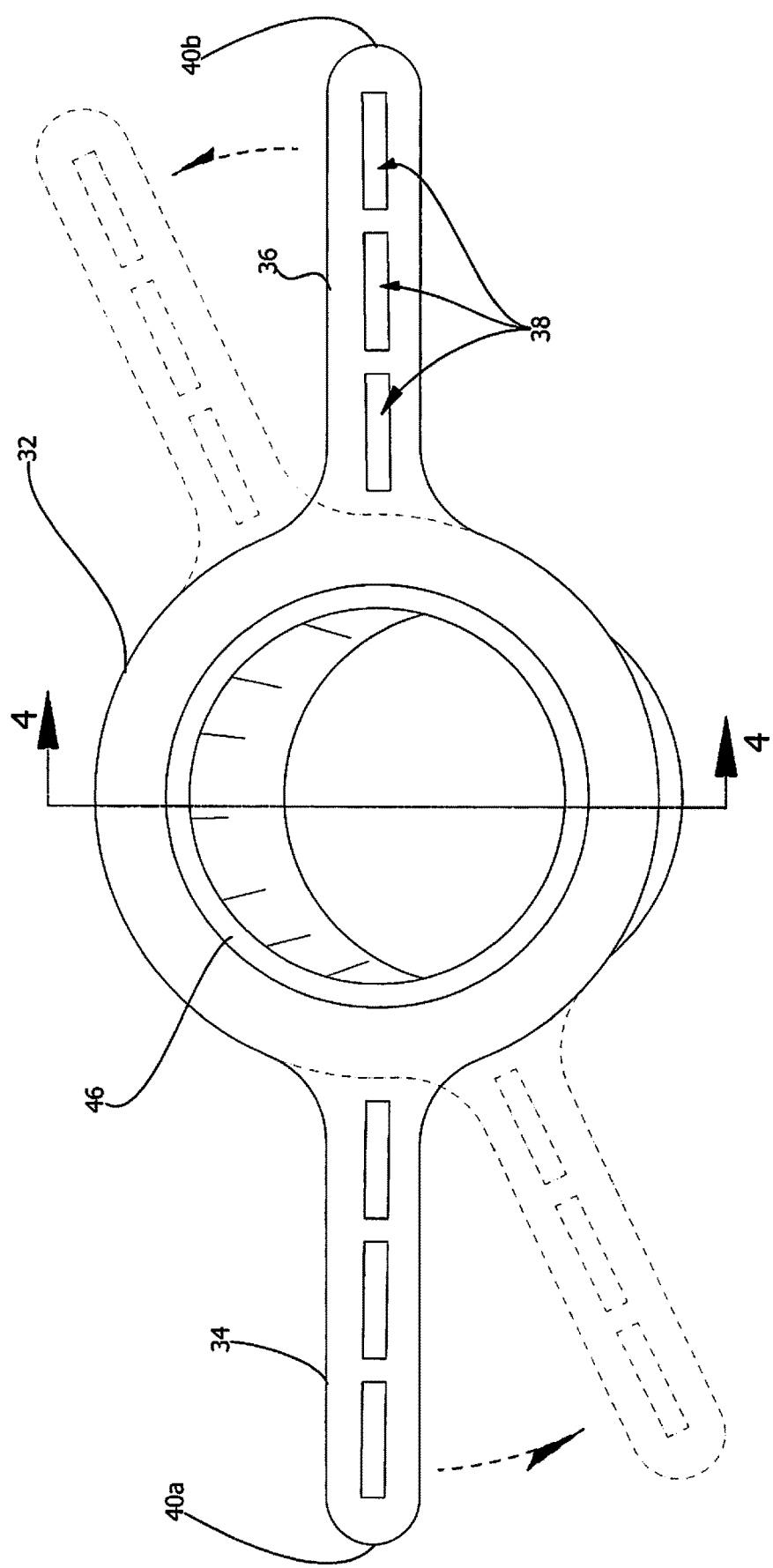
FIG. 3 is a front view of an embodiment of the disclosure.
Figure 6:
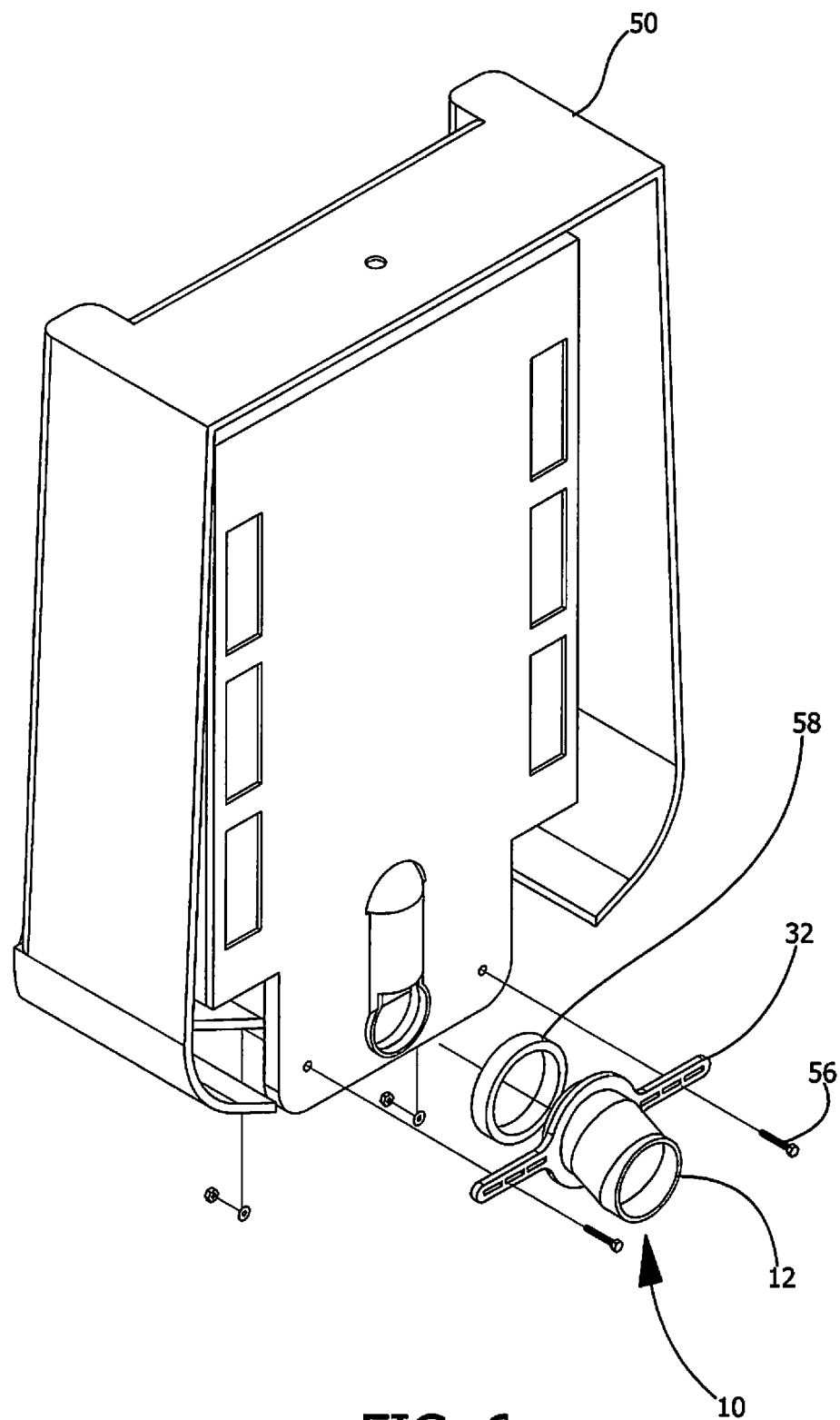
FIG. 6 is an exploded view of an embodiment of the disclosure.

Each of the first 34 and second 36 arms may have a plurality of slots 38 extending therethrough. The plurality of slots 38 on each of the first 34 and second 36 arms may include three slots being positioned at equidistant intervals relative to each other along each of the first 34 and second 36 arms. As shown in FIGS. 1, 3, and 6, each of the plurality of slots 38 may be rectangular. Each of the plurality of slots 38 is generally configured to receive a fastener 56 coupling the flange 32 to the urinal 50. For example, the fastener 56 may comprise a mounting bolt.

Figure 4:
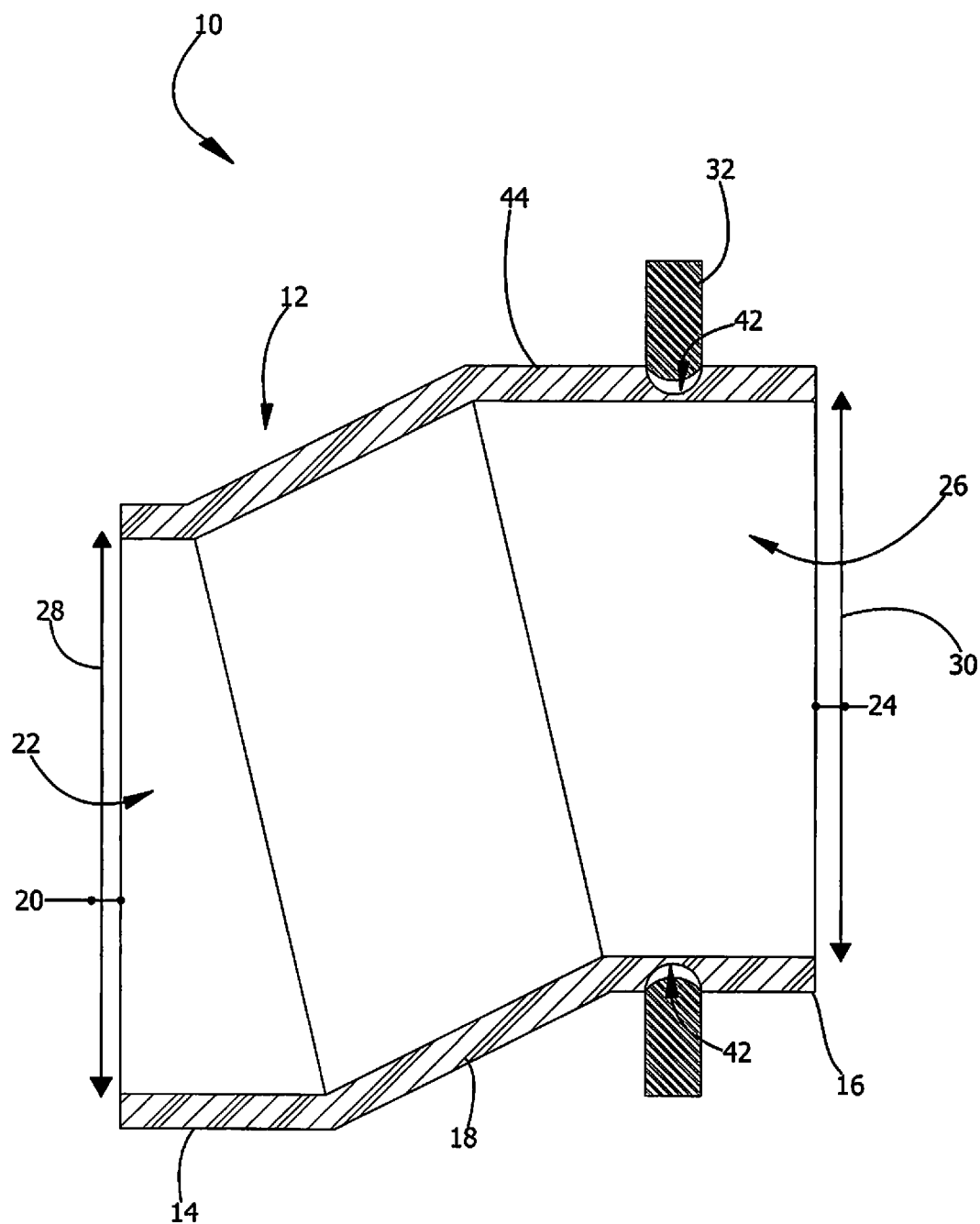
FIG. 4 is a cross-sectional view of an embodiment of the disclosure.

In the embodiment shown in FIG. 4, a groove 42 extends around an exterior surface 44 of the second portion 16. The flange 32 is positioned in the groove 42. The groove 42 holds the flange 32 on the second portion 16 whereby the flange 32 is inhibited from moving along a length of the pipe 12 when the flange 32 rotates around the second portion 16.

A lip 46 may be coupled to the second portion 16. The lip 46 may extend forwardly from the flange 32. For example, the groove 42 may be positioned on the second portion 16 between the middle portion 18 and the lip 46. The lip 46 is generally configured to receive a mounting gasket 58 when the pipe 12 is coupling the urinal 50 with the drainpipe 54.

In use, the first portion 14 is configured to be coupled with the drainpipe 54 and the lip 46, or the second portion 16, is configured to be coupled with the urinal 50 thereby facilitating the urinal 50 in being positioned on the wall 52 relative to the drainpipe 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An offset piping device comprising:
    a pipe having a first portion, a second portion, and a middle portion extending therebetween, the middle portion being angled relative to the first and second portions whereby the first portion is offset from the second portion;
    a flange being rotatably coupled to the second portion, the flange being configured to couple a urinal to a wall when the first portion is being coupled with a drainpipe for the urinal whereby access for the drainpipe relative to the wall is adjusted by the first portion being offset from the second portion, the flange having a rounded interior edge positioned within a circumferential groove extending around the second portion of the pipe, a width of the flange being equal to a width of the circumferential groove, the circumferential groove extending around an exterior surface of the second portion, the groove holding the flange on the second portion whereby the flange is inhibited from moving along a length of the pipe when the flange rotates around the second portion; and
    wherein the first portion is configured to be coupled with the drainpipe and the second portion is configured to be coupled with the urinal thereby facilitating the urinal in being positioned on the wall relative to the drainpipe.

2. The offset piping device of claim 1, wherein a first center point of a first opening extending into the first portion is between 0.5 inches and 1.5 inches vertically offset from a second center point of a second opening extending into the second portion.

3. The offset piping device of claim 2, wherein the first center point is lower than the second center point relative to the middle portion.

4. The offset piping device of claim 1, the pipe further comprising a polyvinyl chloride material.

5. The offset piping device of claim 1, the pipe further comprising an acrylonitrile butadiene styrene material.

6. The offset piping device of claim 1, wherein the pipe has an inner diameter of 2.0 inches and an outer diameter of 2.25 inches.

7. The offset piping device of claim 1, wherein the pipe is 2.0 inches long.

8. The offset piping device of claim 1, the flange further comprising a first arm and a second arm, the first and second arms extending outwardly from the flange.

9. The offset piping device of claim 8, wherein the first arm and the second arm having opposing lateral ends being spaced apart by between 7.0 inches and 9.0 inches.

10. The offset piping device of claim 8, wherein each of the first and second arms have a plurality of slots extending therethrough.

11. The offset piping device of claim 10, the plurality of slots on each of the first and second arms further comprising:
   three slots being positioned at equidistant intervals relative to each other along each of the first and second arms;
   each of the plurality of slots being rectangular; and
   each of the plurality of slots being configured to receive a fastener coupling the flange to the urinal.

12. The offset piping device of claim 11, the fastener further comprising a mounting bolt.

13. The offset piping device of claim 1, wherein the flange rotates in a counterclockwise direction around the second portion.

14. The offset piping device of claim 1, the flange further comprising a metal material.

15. The offset piping device of claim 1, further comprising a lip being configured to receive a mounting gasket when the pipe is coupling a urinal with a drainpipe.

16. The offset piping device of claim 1, further comprising a lip being coupled to the second portion, the lip extending forwardly from the flange, the lip being configured to receive a mounting gasket when the pipe is coupling the urinal with the drainpipe.

17. An offset piping device comprising:
   a pipe having a first portion, a second portion, and a middle portion extending therebetween, the middle portion being angled relative to the first and second portions whereby the first portion is vertically offset from the second portion, a first center point of a first opening extending into the first portion being between 0.5 inches and 1.5 inches vertically offset from a second center point of a second opening extending into the second portion, the first center point being lower than the second center point relative to the middle portion, the pipe comprising a polyvinyl chloride material, the pipe having an inner diameter of 2.0 inches and an outer diameter of 2.25 inches, the pipe being between 1.5 inches and 2.5 inches long;
   a flange being rotatably coupled to the second portion, the flange being configured to couple a urinal to a wall when the first portion is being coupled with a drainpipe for the urinal whereby access for the drainpipe relative to the wall is adjusted by the first portion being vertically offset from the second portion, the flange having a rounded interior edge positioned within a circumferential groove extending around the second portion of the pipe, a width of the flange being equal to a width of the circumferential groove, the circumferential groove extending around an exterior surface of the second portion, the groove holding the flange on the second portion whereby the flange is inhibited from moving along a length of the pipe when the flange rotates around the second portion, the flange including a first arm and a second arm, the first and second arms extending outwardly from the flange, the flange rotating in a counterclockwise direction around the second portion, the flange comprising a metal material;
   wherein each of the first and second arms have a plurality of slots extending therethrough, the plurality of slots on each of the first and second arms including:
      three slots being positioned at equidistant intervals relative to each other along each of the first and second arms;
      each of the plurality of slots being rectangular;
      each of the plurality of slots being configured to receive a fastener coupling the flange to the urinal, the fastener comprising a mounting bolt;
   the first arm and the second arm having opposing lateral ends being spaced apart by between 7.0 inches and 9.0 inches;
   a lip being coupled to the second portion, the lip extending forwardly from the flange, the lip being configured to receive a mounting gasket when the pipe is coupling the urinal with the drainpipe; and
   wherein the first portion is configured to be coupled with the drainpipe and the lip is configured to be coupled with the urinal thereby facilitating the urinal in being positioned on the wall relative to the drainpipe.

\* \* \* \* \*